(12) United States Patent  (10) Patent No.: US 8,355,050 B2
Nozaki  (45) Date of Patent: Jan. 15, 2013

(54) IMAGE REPLAY SYSTEM, DIGITAL CAMERA, AND IMAGE REPLAY DEVICE

(75) Inventor: Hirotake Nozaki, Port Washington, NY (US)

(73) Assignee: Nikon Corporation, Tokyo (JP)

( * ) Notice: Subject to any disclaimer, the term of this patent is extended or adjusted under 35 U.S.C. 154(b) by 216 days.

(21) Appl. No.: 12/227,896

(22) PCT Filed: Jun. 5, 2007

(86) PCT No.: PCT/JP2007/061377
§ 371 (c)(1), (2), (4) Date: Apr. 30, 2009

(87) PCT Pub. No.: WO2007/142237
PCT Pub. Date: Dec. 13, 2007

(65) Prior Publication Data
US 2009/0316021 A1  Dec. 24, 2009

(30) Foreign Application Priority Data
Jun. 6, 2006  (JP) .................................. 2006-156770

(51) Int. Cl.
*H04N 5/225* (2006.01)
*H04N 5/76* (2006.01)
(52) U.S. Cl. .............. 348/207.11; 348/231.3; 348/231.6
(58) Field of Classification Search ............... 348/207.1, 348/207.11, 231.99–231.3, 231.5–231.9, 348/333.11
See application file for complete search history.

(56) References Cited

U.S. PATENT DOCUMENTS

| 7,714,906 | B2 * | 5/2010 | Shiimori ..................... 348/231.2 |
| 2003/0030669 | A1 * | 2/2003 | Ono .............................. 345/747 |
| 2003/0169288 | A1 * | 9/2003 | Misawa ........................ 345/719 |
| 2004/0114904 | A1 | 6/2004 | Sun et al. |
| 2004/0205286 | A1 * | 10/2004 | Bryant et al. ..................... 711/1 |
| 2005/0248681 | A1 * | 11/2005 | Nozaki et al. ................. 348/345 |
| 2006/0139461 | A1 * | 6/2006 | Matsui et al. .............. 348/231.2 |

FOREIGN PATENT DOCUMENTS

| JP | A 2001-218135 | 8/2001 |
| JP | A 2002-169809 | 6/2002 |
| JP | A 2004-104675 | 4/2004 |
| JP | A 2004-194338 | 7/2004 |
| JP | A 2007-6033 | 1/2007 |

OTHER PUBLICATIONS

Sep. 6, 2011 Office Action issued in Japanese Patent Application No. 2006-156770 (with translation).

* cited by examiner

*Primary Examiner* — Daniel M Pasiewicz
(74) *Attorney, Agent, or Firm* — Oliff & Berridge, PLC

(57) ABSTRACT

An image replay system includes a digital camera and an image replay device. The image replay device includes an image recording unit that acquires image information from the digital camera and records it upon a recording medium, a replay unit that replays the image information recorded upon the recording medium, and a transmission unit that transmits to the digital camera usage condition data related to the usage conditions of the image replay device. The digital camera includes a data acquisition unit that acquires the usage condition data from the image replay device, and a control unit that controls the digital camera on the basis of the usage condition data that has been acquired by the data acquisition unit.

6 Claims, 3 Drawing Sheets

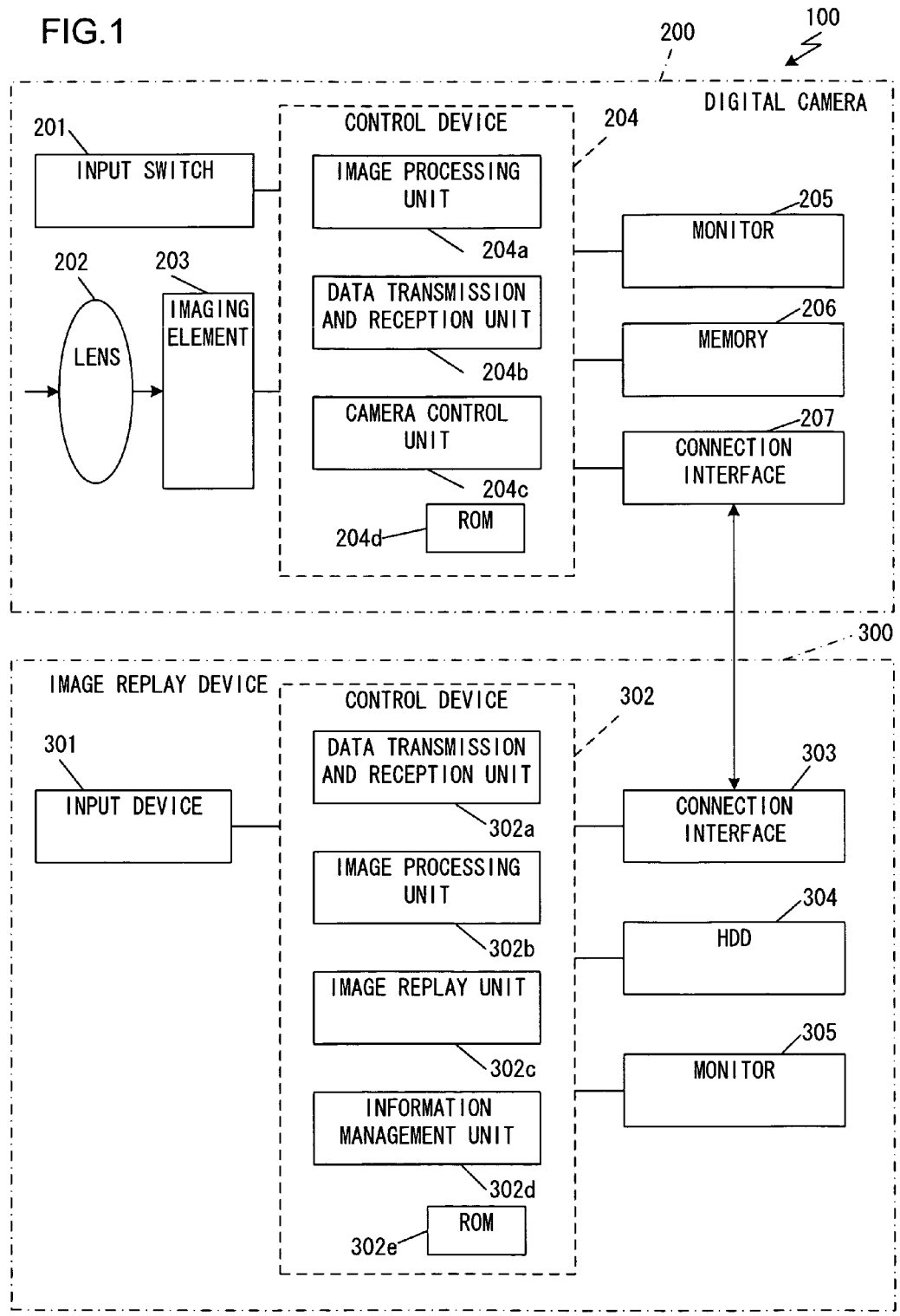

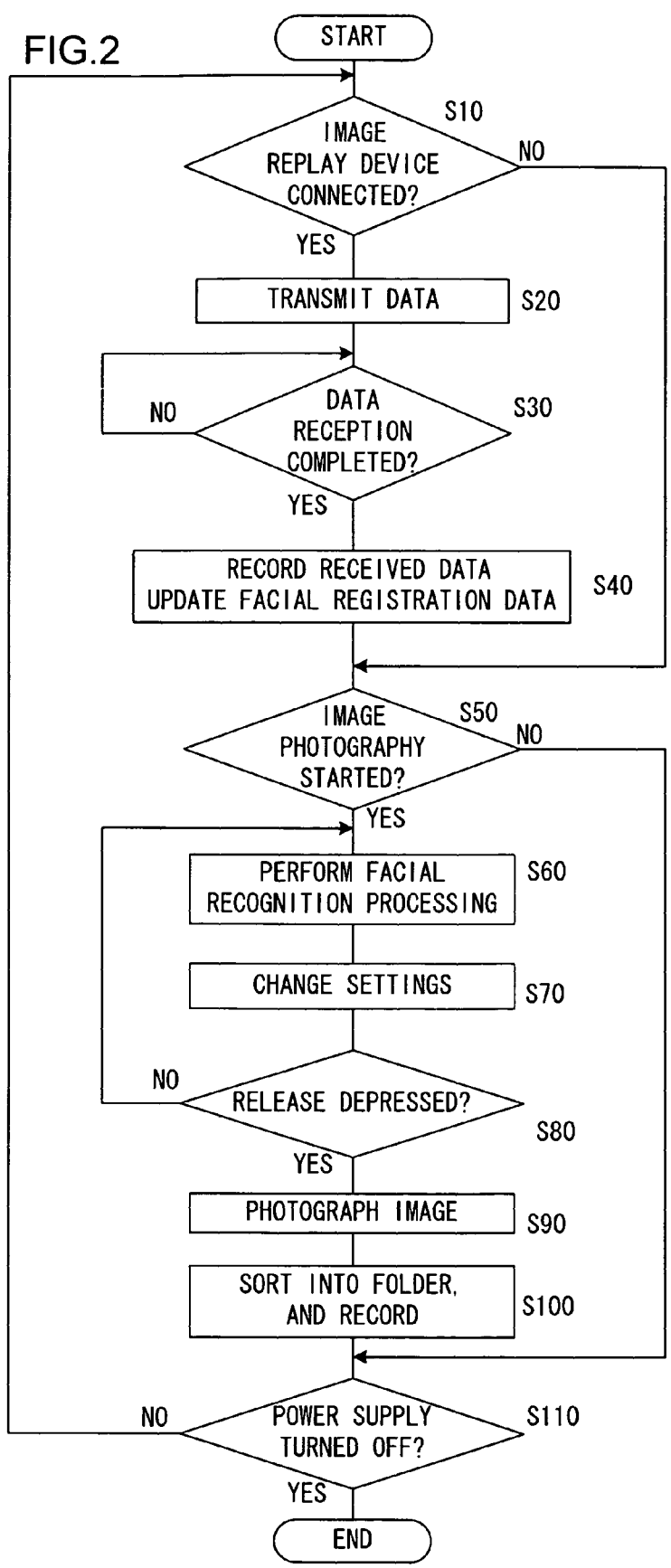

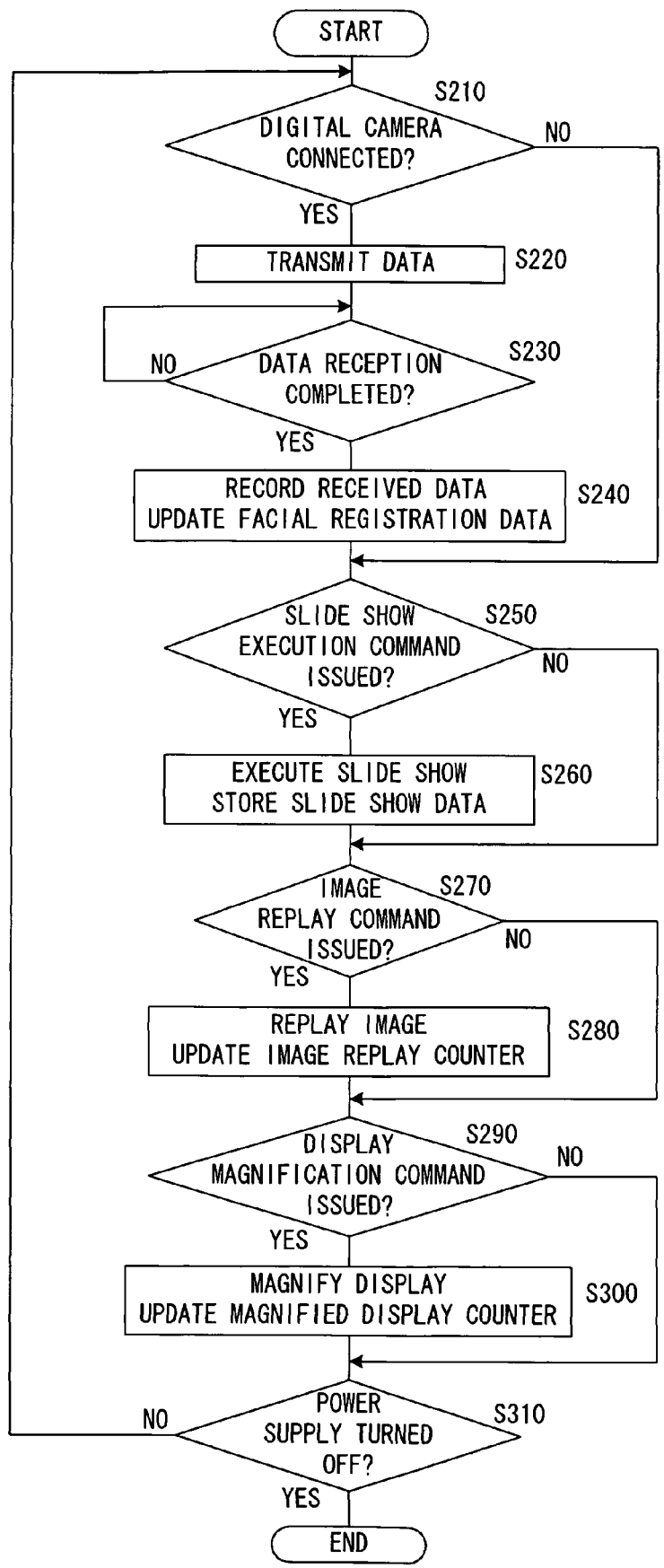

IMAGE REPLAY SYSTEM, DIGITAL CAMERA, AND IMAGE REPLAY DEVICE

TECHNICAL FIELD

The present invention relates to an image replay system for replaying an image that has been photographed with a digital camera by an image replay device, and to a digital camera and an image replay device that constitute this image replay system.

BACKGROUND ART

The following type of image management device is known. With this image management device, reference images are stored for each photographic subject, for recognizing the photographic subject of an inputted image, and the photographic subject in the inputted image is recognized by comparing the reference images with the inputted image. And display of the image is performed according to the result of this recognition of the photographic subject (Patent Reference #1).

Patent Reference #1: Japanese Laid-Open Patent Publication 2002-169809.

DISCLOSURE OF THE INVENTION

Problem to be Solved by the Invention

However, with this prior art image management device, it has been presupposed that the devices will operate individually, and not sufficient consideration has been given to cooperation with the digital camera; so that the user has been obliged to actuate the image management device and the digital camera separately.

Means for Solving the Problem

According to a first aspect of the present invention, an image replay system includes a digital camera and an image replay device, the image replay device comprises: an image recording unit that acquires image information from the digital camera, and records it upon a recording medium; a replay unit that replays the image information recorded upon the recording medium; and a transmission unit that transmits to the digital camera usage condition data related to the usage conditions of the image replay device, and the digital camera comprises: a data acquisition unit that acquires the usage condition data from the image replay device; and a control unit that controls the digital camera, on the basis of the usage condition data that has been acquired by the data acquisition unit.

According to a second aspect of the present invention, in the image replay system described in the first aspect, the usage condition data includes folder structure related data for the folders that have been created upon the recording medium, and the control unit creates folders upon a recording medium possessed by the digital camera, on the basis of the folder structure related data that has been acquired.

According to a third aspect of the present invention, in the image replay system described in the first of second aspect, the usage condition data includes slide show data for images that have been replayed by the replay unit, and the control unit replays images using the slide show data that has been acquired, on the basis of a command from a user.

According to a fourth aspect of the present invention, in the image replay system described in any one of the first through third aspects, each of the digital camera and the image replay device further comprises an identification unit that identifies main photographic subjects that are present in images, using photographic subject information recorded in advance, the usage condition data includes, for the main photographic subjects that have been identified by the identification unit, replay condition data that specifies replay conditions of images by the replay unit, and the control unit changes the settings of the digital camera, on the basis of the replay condition data that has been acquired.

According to a fifth aspect of the present invention, in the image replay system described in the fourth aspect, the replay condition data includes the number of times, for each main photographic subject, that an image thereof has been replayed, the identification unit of the digital camera identifies the main photographic subject during photography, using the photographic subject information, and, if a plurality of main photographic subjects have been identified during photography, the control unit photographs an image while matching the focal point to that main photographic subject of which images have been replayed most times upon the image replay device.

According to a sixth aspect of the present invention, in the image replay system described in the fourth aspect, the replay condition data includes the number of times, for each main photographic subject, that an image thereof has been displayed as magnified, the identification unit of the digital camera identifies the photographic subject during photography, using the photographic subject information, and the control means changes the photographic resolution during photography, according to the number of times that an image of the identified main photographic subject has been displayed upon the image replay device as magnified.

According to a seventh aspect of the present invention, a digital camera is as described in any one of the first through sixth aspects.

According to an eighth aspect of the present invention, an image replay device is as described in any one of the first through sixth aspects.

Advantageous Effect of the Invention

Since the present invention has the structure described above, accordingly it is possible to control the digital camera according to the usage conditions of the image replay device, and it may be anticipated that these two devices will sufficiently cooperate with one another.

BEST MODES FOR CARRYING OUT THE INVENTION

Embodiment One

FIG. 1 is a block diagram showing the structure of an embodiment of an image replay system according to the present invention. This image replay system 100 includes a digital camera 200 that captures an image, and an image replay device 300 that takes in and replays image data captured by the digital camera 200. The digital camera 200 and the image replay device 300 are connected together via a predetermined connection interface, for example a USB interface, and various information is thereby transferred between them. It should be understood that although, in this embodiment, a case is explained in which the digital camera 200 and the image replay device 300 are connected together by cable connection via a USB interface, it would also be acceptable, as an alternative, to connect them together wirelessly by wireless LAN connection or the like, or to arrange to exchange information between the two of them via a recording medium such as a memory card or the like.

The digital camera 200 includes input switches 201, a lens 202, an imaging element 203, a control device 204, a monitor 205, a memory 206, and a connection interface 207. This memory 206 may be a recording medium that is freely fittable and removable, such as, for example, a memory card or a compact hard disk drive.

The input switches 201 include various input members that are actuated by the user. For example, a release button and various actuation buttons for actuating the digital camera 200 are included in these input switches 201.

While the lens 202 includes a plurality of optical lens groups, in FIG. 1, one lens is shown as a representative. The imaging element 203 may be, for example, a CCD, and, by the release button that is included among the input switches 201 being depressed by the user, image data obtained by capturing an image of the photographic subject that is inputted through the lens 202 is outputted to the control device 204.

The control device 204 consists of a CPU and peripheral circuitry thereof, and includes an image processing unit 204a, a data transmission and reception unit 204b, and a camera control unit 204c.

The image processing unit 204a performs per se known processing upon the image data that is inputted from the imaging element 203, such as per se known interpolation processing and tone conversion processing and the like. Moreover, it performs photographic subject recognition processing and detects the photographic subject present in each of these images. And it compares this photographic subject that have been detected with information for comparison of photographic subjects recorded in the memory 206 in advance (hereinafter termed "photographic subject information"), and thereby identifies the photographic subject that has been detected. In this embodiment, for example, per se known facial recognition processing is performed. That is to say, first, the face of the photographic subject that is present within the image is detected. Next, by comparing together this face of the photographic subject that has been detected, and information for facial comparison that is recorded in the memory 206 for identifying individual people (hereinafter termed "facial registration data"), it is identified who the person photographed in this image is.

When the user is pointing the digital camera 200 towards a photographic subject for photographing an image, a through image is outputted from the imaging element 203. The image processing unit 204a performs the facial recognition processing described above for each frame of the through image, and thereby identifies the person who is present in the through image. In this embodiment, the facial registration data is used as photographic subject information. This facial registration data is set by the user in advance, and is recorded in the memory 206. As such facial registration data, the various items of data explained in the following (A) through (H) are registered for each individual.

(A) The Name of the Registered Person

The name of a registered person is a title that is appended for identifying the individual who is the subject of registration. For example, a title that can specify the individual such as the proper name or the nickname of an individual or the like may be registered.

(B) The Facial Photograph Data (Image Data)

The facial photograph data is the photographic image data when the facial recognition data was acquired, and is resized to a predetermined pixel size and registered.

(C) The Day the Facial Photograph was Shot

The day that a facial photograph was shot is date and time data that specifies the date and time that the facial photograph data of (B) was photographed.

(D) The Day that the Person was Registered

The day that the person was registered is date and time data that specifies the date and time that the data related to the person in the facial registration data was registered.

(E) The Date and Time of Data Updating

The date and time of data updating is date and time data that specifies the date and time that the details of the facial registration data related to that person were updated.

(F) The Number of Times that the Registered Person has Been Photographed

The number of times that the registered person has been photographed is data that specifies the number of times that an image of the person who is the photographic subject has been shot. The initial value of this number of times that the registered person has been photographed is zero, and 1 is added to this value if, during photography of an image, facial recognition processing is performed thereupon, and that person is found to be included within the image that has been photographed.

(G) The Facial Characteristic Point Data

The facial characteristic point data is data for comparison, which is used for specifying whose face the face of a person that has been detected from an image is. Generally, in facial recognition processing, the facial region and the facial size and so on of a photographic subject are detected by extracting characteristic points in an image. And, by comparing these characteristic points that have been detected in the image with the facial characteristic point data, whose face this is may be specified. It should be understood that, as these characteristic points, for example, the eyebrows, the eyes, the nose, the end points of the lips, contour points of the face, the top of the head, the lower end point of the chin, or the like may be used.

(H) Other Stored Data

According to requirements, data other than this data (A) through (G) described above may be registered. It should be understood that, in this embodiment, no data is set for this other stored data.

By executing facial recognition processing on the basis of this kind of facial registration data, the image processing unit 204a identifies the photographic subject in the image who has been photographed. Thereafter, the captured image data is recorded in the memory 206. At this time, a folder is made in advance in the memory 206 for each person, corresponding to each person for whom facial registration data is registered. Thus, the image processing unit 204a stores the image data by sorting it into the folders for the people who have been identified by the facial recognition processing. Due to this, it is possible automatically to allocate a folder to be the destination for storage, for each person who has been photographed in an image. It should be understood that, for photography of the image, as will be described hereinafter, if there is some data that has been received from the image replay device 300, then the settings of the digital camera 200 are controlled by the camera control unit 204c.

When it has been detected that the image replay device 300 has been connected via the connection interface 207, the data transmission and reception unit 204b performs transmission and reception of data to and from the image replay device 300. In this embodiment, image data that is recorded in the memory 206, facial registration data (in other words, photographic subject information), and data related to the folder structure that is created within the memory 206 (i.e. data related to folder structure), are transmitted from the digital camera 200 to the image replay device 300.

During the above described transmission, the user is able to set whether or not data is to be transmitted to the image replay device 300. It is arranged for the data transmission and reception unit 204b only to transmit data when a setting to enable data transmission has been set, while no data transmission is performed when data transmission has been set to disabled. And it should be understood that explanation of the data that is received from the image replay device 300 is herein omitted, since it is the same as the data that the image replay device 300 transmits, that will be described hereinafter.

Next, the reason that the facial characteristic data is transmitted from the digital camera 200 to the image replay device 300 will be explained. The reason is in order to establish synchronization between the facial recognition data possessed by the image replay device 300 and the facial recognition data possessed by the digital camera 200, since, as will be described hereinafter, the image replay device 300 can also execute facial recognition processing. During this transmission, if the facial recognition data possessed by the digital camera 200 and the facial recognition data possessed by the image replay device 300 are in the same data format, then the data transmission and reception unit 204b transmits the above described data (A) through (H) for each person to the image replay device 300 just as it is.

On the other hand, if the facial recognition data possessed by the digital camera 200 and the facial recognition data possessed by the image replay device 300 are not in the same data format, then the data transmission and reception unit 204b transmits the facial registration data after it has been edited and matched to the data format on the side of the image replay device 300. For example, if the facial recognition data possessed by the image replay device 300 consists only of the data (A) and (B), then the transmitted data is edited as follows:

(A) The Name of the Registered Person

The information for (A) that is recorded in the memory 206 is used just as it is, without change.

(B) The Facial Photograph Data

The information for (B) that is recorded in the memory 206 is used just as it is, without change.

(C) The Day the Facial Photograph was Shot

No data is set.

(D) The Day that the Person was Registered

The date and time of transmission of data by the data transmission and reception unit 204b (i.e. the data transfer date and time) is set.

(E) The Date and Time of Data Updating

The date and time of transmission of data by the data transmission and reception unit 204b (i.e. the data transfer date and time) is set.

(F) The Number of Times that the Registered Person has Been Photographed

No data is set.

(G) The Facial Characteristic Point Data

The data transmission and reception unit 204b extracts facial characteristic points on the basis of the facial photograph data of (B) and creates this data.

(H) Other Stored Data

No data is set.

When transmitting data to the image replay device 300, the data transmission and reception unit 204b that is included in the digital camera 200 checks whether or not there is any vacant capacity upon a hard disk drive (hereinafter termed a HDD) 304 that is provided to the image replay device 300, for recording image data and facial registration data that it proposes to transmit. And, if it has decided that there is no vacant capacity on the HDD 304 on the image replay device 300 side, then it does not perform transmission of the data. It would also be acceptable to arrange to transmit, as a priority, image data of which the day of photography is recent, and facial registration data of persons of whom the day of registration is recent; or to arrange to transmit, as a priority, the facial registration data of persons of whom the frequency of being photographed is high.

According to command from the user, the camera control unit 204c replays images that are recorded in the memory 206, and changes the settings of the digital camera 200. The camera control unit 204c changes the settings of the digital camera 200 on the basis of the data that has been received from the image replay device 300. The processing that is performed by the camera control unit 204c to change the settings will be described hereinafter with reference to FIG. 2, along with the details of the data that the data transmission and reception unit 204b receives from the image replay device 300.

Next, the image replay device 300 will be explained. In this embodiment, a photo storager for accumulating images is used as this image replay device 300. The image replay device 300 includes an input device 301, a control device 302, a connection interface 303, a HDD (hard disk drive) 304, and a monitor 305.

The input device 301 includes a remote controller for actuation. Buttons (keys) that are required for actuating the image replay device 300 is mounted to this remote controller. By the user actuating the remote controller, it is possible for him to issue various commands to the image replay device 300.

The connection interface 303 can use the USB interface, just like the connection interface 207 provided to the digital camera 200. It is possible to store image data that has been taken in from the digital camera 200 upon the HDD 304 as will be described hereinafter, and also possible to store various programs to be executed by the image replay device 300 thereupon. As will be described hereinafter, an image processing unit 302b that is provided to the control device 302 is able to perform facial recognition processing, in a similar manner to the image processing unit 204a of the digital camera 200. And the facial registration data that is used at this time is also recorded upon this HDD 304. In this facial recognition processing, as already described, per se known facial recognition processing or facial recognition processing that is set in advance may be performed.

The control device 302 consists of a CPU, a memory, and other peripheral circuitry, and includes a data transmission and reception unit 302a, an image processing unit 302b, an image replay unit 302c, and an information management unit 302d.

Via the connection interface 303, the data transmission and reception unit 302a receives the various items of information described above that are transmitted from the digital camera 200. And, on the basis of the data related to the folder structure that has been received, it creates folders within the HDD 304. In other words, it decides upon the folder structure that is created by the digital camera on the basis of the data related to this folder structure that it has received, and compares this with the folder structure of the folders that are already created upon the HDD 304. And, if there are any folders that are present upon the digital camera 200 but not upon the image replay device 300, then synchronization processing of the folder structure is performed by creating these folders upon the HDD 304.

The data transmission and reception unit 302a records the facial registration data that it has received as facial registration data that is recorded upon the HDD 304 in advance. When performing this recording, it compares together the facial registration data that has been received and the facial registration data that is recorded upon the HDD 304 in advance. And it extracts that data for which the result of this comparison is disagreement (in other words, data that has been updated on the side of the digital camera 200), and data for which the result of this comparison is that it is not present (in other words, data that has been newly registered on the side of the digital camera 200), and updates the facial registration data upon the HDD 304 therewith.

According to the result of comparing together the facial registration data that has been received and the facial registration data that is recorded upon the HDD 304, if items of data for which the facial characteristic point data are different despite the fact that the names of the registered persons are the same are present, then these are recorded upon the HDD 304 as facial registration data for different people. For example if, in two items of facial registration data, one of which is upon the HDD 304 and the other of which has been received, the name of the registered person is "child" in both cases, but the facial characteristic point data in these two data items are different, then these are recorded as separate data items, i.e. as "child 1" and "child 2".

By contrast, if items of data for which the facial characteristic point data agree despite the fact that the names of the registered persons are different are present, then both of these are considered as being facial registration data for the same person. In this case, the data transmission and reception unit 302a records both of them upon the HDD 304 just as they are without modification, and, when the power supply to the image replay device 300 is turned on again by the user for the next time, issues a warning upon the monitor 305 to the effect that several sets of facial recognition data are registered for which the possibility is high that they relate to the same person.

The image processing unit 302b performs the facial recognition processing described above upon the image data that has been received by the data transmission and reception unit 302a, and identifies the persons who have been photographed within the images. And the image data is recorded upon the HDD 304 while being sorted into folders that correspond to the people who have been identified.

The image replay unit 302c replays images according to commands from the user, and displays them upon the monitor 305. In this embodiment, the user is able to issue a command to designate and to replay any one or a plurality of the images that are recorded upon the HDD 304. The image replay unit 302c displays the images that have been designated individually upon the monitor 306, one at a time. And the user is able to select a plurality of images from among the images that are recorded upon the HDD 304, and to issue a command for these images to be displayed as a slide show. In this case, the image replay unit 302c performs slide show replay for these images that have been selected.

The image replay unit 302c records data related to the slide show that has been replayed upon the HDD 304 as slide show data. In this embodiment it would also be acceptable, when replaying images as a slide show, to arrange to ask the user whether or not to record the slide show data, and to perform recording only if recording has been commanded by the user. As this slide show data, there may be recorded image data for the plurality of images that have been designated, a display pattern to use as a display effect, the display speed, music data that is to be replayed at the same time, and soon. Moreover, with the image data described above, it would also be acceptable to arrange to record this data after having shrunk it down to the size of the liquid crystal monitor that is provided to the digital camera 200, for example to the QVGA size.

If the digital camera 200 is endowed with a function of replaying video, then it would be acceptable to arrange to create and record video data that displays the images that are to be replayed in order as a slide show. As this video data, for example, video data in the MEPG4 format of QVGA display size at a frame rate of 30 fps may be created and recorded.

The user is also able to issue a command to display in magnified form the images that are to be displayed. If such image display magnification has been ordered by the user, then the image replay unit 302c magnifies the images that are being replayed by a predetermined magnification, for example X2, before displaying them upon the monitor 306. There can be more than one stage for this magnified display; it would also be possible to perform this magnification by changing it over in a plurality of stages, such as, for example, X1.5, X2, X3 . . . and so on.

While replaying the images with the image replay unit 302c, the information management unit 302d identifies the persons who are present within these images that it has replayed, and counts the number of times for each person that his image has been replayed. Moreover, when the images have been displayed as magnified, it identifies the persons who are present within these images that it has displayed as magnified, and counts the number of times for each person that his magnified image has been replayed. In other words, when replaying images with the image replay unit 302c, the information management unit 302d controls the image processing unit 302b and identifies the persons who are present within the images that have been replayed, and counts, for each person, the number of times an image has been replayed and the number of times an image has been displayed as magnified.

The count values described above are recorded upon the HDD 304 as replay condition data. For example, the information management unit 302d may record upon the HDD 304 a replay counter for each person for counting the number of times that an image of that person has been replayed, and, each time an image is replayed, may add 1 to the counted values of the replay counters for those people who are photographed in that image. Or, it may record upon the HDD 304 a magnified display counter for each person for counting the number of times that a magnified image of that person has been replayed, and, each time a magnified image is replayed, may add 1 to the counted values of the magnified display counters for those people who are photographed in that image. This replay condition data in which the count values of these counters are provided for each person as a database is recorded upon the HDD 304.

When it has been detected that the digital camera 200 has been connected via the connection interface 303, the data transmission and reception unit 302a transmits (a) and (b) as shown below to the digital camera 200 as data that specifies the usage condition of the image replay device 300 (hereinafter termed the "usage condition data"):

(a) The facial registration data, slide show data, and replay conditions data recorded upon the HDD 304;

(b) Data related to the structure of the folders that have been created upon the HDD 304 (hereinafter termed the "folder structure related data").

In the digital camera 200, the data transmission and reception unit 204b receives this usage condition data. And the data transmission and reception unit 204b records this data that it has received in the memory 206. Moreover, when recording the facial registration data in the memory 206, the data transmission and reception unit 204b compares together the facial registration data that it has received with the facial registration data that is already recorded in the memory 206. And it extracts data that does not agree according to this comparison (in other words, data that has been updated on the side of the image replay device 300), and data that is missing (in other words, data that was newly registered on the side of the image replay device 300), and updates the facial registration data in the memory 206 therewith. Furthermore, on the basis of the folder structure related data that it has received, the data transmission and reception unit 204b creates folders within the memory 206.

If a reply command is issued by the user for any of the slide show data that is recorded in the memory 206, then the camera control unit 204c reads in the corresponding slide show data from the memory 206 and replays it.

And, when photographing an image, the camera control unit 204c changes the settings of the digital camera 200 during photography, on the basis of the replay conditions data that is recorded in the memory 206. In concrete terms, the camera control unit 204c determines the AF priority level during image photography, on the basis of the number of times included in the replay condition data that an image of each person has been replayed. Moreover, the unit 204c changes the resolution during image photography on the basis of the number of times that an image of each person has been displayed as magnified. It should be understood that, in this embodiment, the camera control unit 204c may detect that photography of an image has started when, for example, the mode of the digital camera 200 has been set to the photographic mode by the user.

When the user has pointed the digital camera 200 at a photographic subject for photographing an image, then the camera control unit 204c identifies the photographic subject or subjects present in the through image that is inputted from the imaging element 203, on the basis of the output from the image processing unit 204a. In other words, the image processing unit 204a performs facial recognition processing upon each frame of the through image, as described above, and identifies the person or persons who are present in that through image.

If the result of identification of the persons present in the through image by the image processing unit 204a is that a single person has been identified from within the through image, then the camera control unit 204c controls the AF of the digital camera 200 so as to set the focal point upon that person. By contrast, if a plurality of persons have been identified from within the through image, then the AF priority level during image photography is determined on the basis of the identification result and the number of times that an image of each of the persons has been replayed. In other words, the AF priority level of that person, among the plurality of people who have been identified, for whom the number of times an image has been replayed is the greatest, is raised, and the AF of the digital camera 200 is controlled so as to set the focal point upon that person. For example, if two people A and B are present within the through image, and the number of times that an image of A has been replayed is 10 while the number of times that an image of B has been replayed is 5, then the AF of the digital camera 200 is controlled so as to set the focal point upon the person A.

By performing the AF control in this manner, when the user has pointed the digital camera 200 at a photographic subject for photographing an image, then it is possible to set the focal point automatically upon that person whose image has been replayed most often upon the image replay device 300. As a result, by the user simply depressing the release button, it is possible for him to photograph an image that is focused upon the person for whom the possibility is high that the user may consider that person to be the main photographic subject whom he wishes to photograph.

And the camera control unit 204c sets the resolution during photography on the basis of the number of times that a magnified image has been displayed of the person within the through image who has been identified by the image processing unit 204a. By raising the resolution in advance while photographing an image of, for example, a person for whom magnified display has often been performed, it is possible to display the resulting image very clearly, even when it has been being displayed as magnified. As described above, the camera control unit 204c controls the digital camera 200 so as to photograph an image at high resolution, if a person is included in the through image for whom the number of times that an image has been displayed as magnified is greater than or equal to a predetermined number of times.

FIG. 2 is a flowchart showing processing performed by the digital camera 200 of this embodiment. The processing shown in FIG. 2 is executed by the control device 204 as a program that starts when the power supply to the digital camera 200 is turned on. This program is stored in a ROM (a read only memory) 204d that is provided internally to the digital camera 200. This program could also be stored in the memory 206.

In a step S10, the data transmission and reception unit 204b makes a decision as to whether or not an image replay device 300 has been connected via the connection interface 207. If it has been decided that no image replay device 300 is connected, then the flow of control is transferred to a step S50 that will be described hereinafter. By contrast, if it has been decided that an image replay device 300 has been connected, then the flow of control proceeds to a step S20.

In the step S20, the data transmission and reception unit 204b transmits to the image replay device 300 the data recorded in the memory 206, i.e. the image data, the facial registration data, and the folder structure related data for the folders created within the memory 206. At this time, as described above, the data transmission and reception unit 204b creates facial registration data including the data (A) through (H) for each individual person, on the basis of the data format of the facial registration data held by the replay device 300. Moreover, the vacant capacity of the HDD 304 that is provided to the image replay device 300 is checked, and data is transmitted corresponding to this vacant capacity. Then the flow of control proceeds to a step S30.

In the step S30, a decision is made as to whether or not the reception from the image replay device 300 of the facial registration data, the slide show data, the replay condition data, and the folder structure related data has been completed. If it has been decided that the reception of data has been completed, then the flow of control proceeds to a step S40. In this step S40, the data transmission and reception unit 204b records the data that has been received in the memory 206. At this time, the facial registration data that has been received and the facial registration data that is already recorded in the memory 206 are compared together, the data that has been updated on the side of the image replay device 300 and the data that has been newly registered on the side of the image replay device 300 are extracted, and the facial registration data in the memory 206 is updated. Then the flow of control proceeds to the step S50.

In the step S50, a decision is made as to whether or not photography of an image has been started by the user. If it has been decided that photography of an image by the user has not been started, then the flow of control is transferred to a step S10 that will be described hereinafter. By contrast, if it has been decided that photography of an image has been started, then the flow of control proceeds to a step S60. In this step S60, the image processing unit 204a performs the above described facial recognition processing upon each frame of the through image that is being inputted from the imaging element 203 and identifies the photographic subject present in this through image, and then the flow of control proceeds to a step S70.

In the step S70, the camera control unit 204c changes the settings of the digital camera 200 during photography, on the basis of the results of the identification by the image processing unit 204a of persons present in the through image, and on the basis of the replay condition data recorded in the memory 206. In other words, it changes the AF priority level and the resolution during photography of the digital camera 200. Then the flow of control proceeds to a step S80, in which the camera control unit 204c makes a decision as to whether or not the release button has been depressed by the user. If it has been decided that the release button has not been depressed, then the flow of control returns to the step S60 and the above processing is repeated. On the other hand, if it has been decided that the release button has been depressed, then the flow of control proceeds to a step S90.

In this step S90, the camera control unit 204c acquires, as a photographic image, an image of the frame that was being inputted from the imaging element 203 at the timing that the release button was depressed by the user. Then the flow of control proceeds to a step S100 in which, after having performed image processing of various types upon this photographed image, the image processing unit 204a records the resulting image in the memory 206, sorted into the folder that corresponds to the photographic subject within the image that is already specified. Then the flow of control proceeds to a step S110.

In this step S110, a decision is made as to whether or not the power supply of the digital camera 200 has been turned off by the user. If it has been decided that the power supply has not been turned off, then the flow of control returns to the step S10 and the above processing is repeated. By contrast, if it has been decided that the power supply has been turned off, then this processing terminates.

FIG. 3 is a flow chart showing processing performed by the image replay device 300 of this embodiment. The processing shown in FIG. 3 is executed by the control device 302 as a program that starts when the power supply to the image replay device 300 is turned on. This program is stored in a ROM (a read only memory) 302e that is provided internally to the image replay device 300. This program could also be stored on the HDD 304.

In a step S210, the data transmission and reception unit 302a makes a decision as to whether or not a digital camera 200 has been connected via the connection interface 303. If it has been decided that no digital camera 200 is connected, then the flow of control is transferred to a step S250 that will be described hereinafter. By contrast, if it has been decided that a digital camera 200 has been connected, then the flow of control proceeds to a step S220.

In the step S220, the data transmission and reception unit 302a transmits to the digital camera 200, via the connection interface 303, the data recorded on the HDD 304, i.e. the facial registration data, the slide show data, the replay condition data, and the folder structure related data. Then the flow of control proceeds to a step S230, in which a decision is made as to whether or not the reception from the digital camera 200 of the image data, the facial registration data, and the folder structure related data for the folders created in the memory 206 has been completed. If it is decided that the reception of this data has been completed, then the flow of control proceeds to a step S240.

In this step S240, the data transmission and reception unit 302a creates one or more folders upon the HDD 304 on the basis of the folder structure related data that has been received, and updates the facial registration data that is recorded upon the HDD 304 using the facial registration data that has been received. And it sorts the image data and the slide show data that it has received person by person, and records it upon the HDD 304. Then the flow of control proceeds to a step S250.

In the step S250, the image replay unit 302c makes a decision as to whether or not a command has been issued by the user for execution of a slide show. If it has been decided that no command for execution of a slide show has been issued, then the flow of control is transferred to a step S270 that will be described hereinafter. By contrast, if it has been decided that a command for execution of a slide show has been issued, then the flow of control proceeds to a step S260. In this step S260, the image replay unit 302c displays upon the monitor 305 the images that have been selected by the user as the subjects of the slide show in order, thus replaying the slide show. Moreover, the slide show data at this time is created and recorded upon the HDD 304. Then the flow of control proceeds to the step S270.

In this step S270, the image replay unit 302c makes a decision as to whether or not a command has been issued by the user to replay an image. If it has been decided that no command to replay an image has been issued, then the flow of control is transferred to a step S290 that will be described hereinafter. By contrast, if it has been decided that a command to replay an image has been issued, then the flow of control proceeds to a step S280. In this step S280, the image replay unit 302c displays and replays the image that has been selected by the user upon the monitor 305. And the information management unit 302d identifies the person present in this image that is being replayed, and adds 1 to the replay counter of the person who has been identified. Then the flow of control proceeds to the step S290.

In this step S290, the image replay unit 302c makes a decision as to whether or not a command for magnified display of the image has been issued by the user. If it has been decided that no command for magnified display of the image has been issued, then the flow of control is transferred to a step S310 that will be described hereinafter. By contrast, if it has been decided that a command for magnified display of the image has been issued, then the flow of control proceeds to a step S300. In this step S300, the image replay unit 302c displays the image being displayed upon the monitor 205 as magnified. And the information management unit 302d adds 1 to the magnified display counter for the person who is present within this image that is being displayed as magnified, and then the flow of control proceeds to the step S310.

In this step S310, a decision is made as to whether or not the power supply of the image replay device 300 has been turned off by the user. If it has been decided that the power supply has not been turned off, then the flow of control returns to the step S210 and the above processing is repeated. By contrast, if it has been decided that the power supply has been turned off, then this processing terminates.

According to this embodiment as explained above, the following operations and effects may be obtained.

(1) It is arranged to transmit the facial registration data held by the digital camera 200 to the image replay device 300, and to update the facial registration data held by the image replay device 300 using this facial registration data that has been transmitted from the digital camera 200. By doing this, it is possible to synchronize the facial registration data between the digital camera 200 and the image replay device 300, and, merely by the user registering and updating the facial registration data upon the digital camera 200, it becomes possible also to use these details upon the image replay device 300.

(2) It is arranged for both the image processing unit 204a of the digital camera 200, and the image processing unit 302b of the image replay device 300, to perform facial recognition processing using the facial registration data. Due to this, it becomes possible for both the digital camera 200 and the image replay device 300 to identify a person present within an image.

(3) It is arranged for the usage condition data to be transmitted from the image replay device 300 to the digital camera 200, and, in the digital camera 200, for the camera control unit 204c to control the digital camera 200 on the basis of this usage condition data that has been received. Due to this, it is possible automatically to reflect the condition of usage of the image replay device 300 by the user, in the control of the digital camera 200.

(4) It is arranged to include the folder structure related data that has been created upon the HDD 304 in the usage condition data, and for folders to be created within the memory 206 by the digital camera 200 that has received this data, on the basis of the folder structure related data that has been received. Moreover, it is arranged for the folder structure related data to be transmitted from the digital camera 200 to the image replay device 300, and for folders to be created within the HDD 304 by the image replay device 300 that has received this data, on the basis of this folder structure related data that has been received. Due to this, it is possible automatically to synchronize the folders that have been created by the user on both the digital camera 200 and the image replay device 300.

(5) It is arranged to include slide show data for images that have been replayed upon the image replay device 300 in the usage condition data. Due to this, it is possible to go through a slide show of images that has been replayed upon the image replay device 300, also upon the digital camera 200.

(6) It is arranged for replay condition data for each photographic subject to be included in the usage condition data, and, in the digital camera 200, for the camera control unit 204c to change the settings of the digital camera 200, on the basis of this replay condition data that has been received. Due to this, it is possible to reflect the usage conditions of the image replay device 300 in the settings of the digital camera 200 during image photography.

(7) It is arranged to transmit, as replay condition data for each photographic subject, the number of times that an image of each photographic subject has been replayed, and for the camera control unit 204c, if a plurality of photographic subjects have been specified during photography, to photograph an image in which the focal point is adjusted upon that photographic subject for which the number of times of image replay is the greatest. Due to this, it is possible to photograph an image in which the focal point is automatically adjusted upon the main photographic subject, while taking into account the fact that the possibility is high that a person of whom images have often been replayed is the person whom the user considers to be the main photographic subject.

(8) It is arranged to transmit, as replay condition data for each photographic subject, the number of times that an image of each photographic subject has been displayed as being magnified during replay, and for the camera control unit 204c to change the photographic resolution during photography, according to the number of times that an image of the specified photographic subject has been displayed upon the image replay device in a magnified state. Due to this, it is possible to photograph at high resolution an image in which, as the photographic subject, a person is included for whom the number of times that an image has been displayed as magnified is high, and the user becomes able to inspect this image while displaying it in magnified form in an attractive manner.

Other Embodiments

The image replay system according to the first embodiment as explained above may also be varied in the following ways.

(1) In the first embodiment described above, the facial registration data was transmitted from the digital camera 200 to the image replay device 300. And the data transmission and reception unit 302a of the image replay device 300 compares this facial registration data that has been received with the facial registration data that is recorded in advance upon the HDD 304. And it extracts the data that does not agree and the data that is not present, and updates the facial registration data upon the HDD 304 therewith. However, it would also be acceptable, when transmitting the data from the digital camera 200, for the data transmission and reception unit 204b to compare together the facial registration data that is recorded in the memory 206 and the facial registration data that is recorded upon the HDD 304 of the image replay device 300, and to transmit to the image replay device 300 only the facial registration data that is not already upon the HDD 304.

(2) In the first embodiment described above, the information management unit 302d of the image replay device 300 records, for each person, the number of times that an image of that person has been replayed and the number of times that an image of that person has been displayed in the magnified state, and the data transmission and reception unit 302a transmits this replay condition data to the digital camera 200. And the camera control unit 204c of the digital camera 200 changes the settings of the digital camera 200 according to the replay condition data that has been received. However, it would be possible for the information management unit 302d to be adapted to record data such as the number of times the user has printed each image, or the like, as being included in the usage conditions of the image replay device 300. By employing this type of structure, it is possible for the camera control unit 204c to change the settings of the digital camera 200 using the data described above.

(3) In the first embodiment described above, the image processing unit 204a of the digital camera 200 and the image processing unit 302b of the image replay device 300 identify the persons who are present within the images, by performing predetermined facial recognition processing for recognizing the photographic subjects. However, it would also be acceptable to arrange to make decisions as to the photographic scenes of the images, by performing per se known scene decision processing. Moreover, it would also be acceptable to record the images while sorting them into folders according to their scenes, both in the digital camera 200 and in the image replay device 300.

(4) In the first embodiment described above, the facial registration data that is recorded upon the HDD 304 of the image replay device 300 is transmitted to the digital camera 200. However this is not limitative; for example, it would also be acceptable to arrange to extract, among the facial registration data that is recorded upon the HDD 304 of the image replay device 300, only that facial registration data that corresponds to persons for whom the value of the replay counter or the value of the magnified display counter is greater than some constant value, and to transmit this data to the digital camera 200.

(5) In the first embodiment described above, the camera control unit 204c of the digital camera 200 changes the AF priority level during image photography on the basis of the replay condition data that have been received from the image replay device 300. However, it would also be acceptable to arrange to set the AE during image photography.

(6) In the first embodiment described above, the information management unit 302d of the image replay device 300 counts, for each person, the number of times that an image of that person has been replayed, and transmits the result to the digital camera 200; and the camera control unit 204c of the digital camera 200 changes the AF priority order during image photography, on the basis of that number of times of image replay. However, it would also be acceptable to arrange for the information management unit 302d also to count the number of times each image is replayed, and for the camera control unit 204c to consider an image that has been replayed often as being the favorite image of the user, and to make a setting so that this image becomes the wall paper of the camera, or so that it becomes the screen when the camera starts. Moreover, it would also be acceptable to arrange to make it possible for the user to designate a "favorite image" upon the image replay device 300, and for the camera control unit 204c to set this image that has been designated as the "favorite image" as the wall paper of the camera, or as the screen when the camera starts.

(7) In the first embodiment described above, the replay condition data was transmitted from the image replay device 300 to the digital camera 200, and the camera control unit 204c of the digital camera 200 changes the settings of the digital camera 200 on the basis of this replay condition data. However, it would also be acceptable to arrange to provide the image replay device 300 with the same function as the camera control unit 204c, and to change the settings of the digital camera 200 from the side of the image replay device 300 on the basis of the replay condition data.

The programs that have been explained with reference to FIGS. 2 and 3 may be read into the digital camera 200 or the image replay device 300 via a recording medium that can be freely fitted and removed. Moreover, these programs that are required by the digital camera 200 or the image replay device 300 may be read in via a computer program product that contains the programs in a format that can be read in by a computer. Or, these programs that are required by the digital camera 200 or the image replay device 300 may also be read in via a communication circuit not shown in the figures. To put this in another manner, in the embodiments described above, the control program that is executed by the digital camera 200 or by the image replay device 300 is normally burnt into a ROM or the like during manufacture. However, it would also be possible to provide a ROM that is equipped with the control program as a rewriteable ROM, to connect it to a computer not shown in the figures, and to receive supply of an improved program from a recording medium such as a CD-ROM or the like via this computer. Yet further, it would also be possible to receive supply of such an improved program via the internet or the like.

While in the above various embodiments and variant embodiments have been explained, the present invention should not be considered as being limited by the details thereof. Other modes that may be considered to fall within the scope of the technical concept of the present invention are also included within the range of the present invention.

The content of the disclosure of the following priority application is incorporated herein by reference:

Japanese Patent Application 2006-156770 (filed on Jun. 6, 2006).

BRIEF DESCRIPTION OF THE DRAWINGS

FIG. 1 is a block diagram showing an embodiment of an image replay system to which the present invention has been applied;

FIG. 2 is a flow chart showing a sequence of processing performed by a digital camera 200; and FIG. 3 is a flow chart showing a sequence of processing performed by an image replay device 300.

The invention claimed is:

1. An image replay system including a digital camera and an image replay device, wherein:
the digital camera and the image replay device are able to be connected together via a predetermined connection interface by cable connection or by wireless connection;
the image replay device comprises:
a control device;
an image recording unit that acquires image information from the digital camera, and records it upon a recording medium;
an image replay unit that replays the image information recorded upon the recording medium;
an identification unit that identifies main photographic subject in an image that has been read down from the digital camera; and
a transmission and reception unit that enables to transmit to digital camera usage condition data related to usage conditions of the image replay device when it has been detected that the digital camera has been connected via the connection interface; and
the digital camera comprises:
a data acquisition unit that acquires the usage condition data from the image replay device;
a control unit that controls the digital camera, on the basis of the usage condition data that has been acquired by the data acquisition unit;
an imaging element that outputs image data obtained by capturing an image of the photographic subject that is inputted to the control unit;
an identification unit that identifies main photographic subject by detecting a face of the photographic subject that is present within the through image inputted from the imaging element and comparing with an information of facial registration data; and
a transmission and reception unit that transmits image data and facial registration data to the image replay device when it has been detected that the image replay device has been connected via the connection interface,
wherein:
the usage condition data includes replay condition data that specifies the number of times, for each of the main photographic subjects that have been identified by the identification unit of the image replay device, that an image thereof has been replayed by the replay unit; and
the control unit of the digital camera changes the settings of the digital camera during photography, on the basis of the usage condition data about the number of times that the image of each main photographic subject which is specified by the identification unit of the digital camera has been replayed by the replay unit of the image replay device.

2. The image replay system according to claim 1, wherein:

the usage condition data includes folder structure related data for folders that have been created upon the recording medium of the image replay device; and the control unit of the digital camera creates folders upon a recording medium possessed by the digital camera, on the basis of the folder structure related data that has been acquired.

3. The image replay system according to claim 1, wherein:

the usage condition data includes slide show data for images that have been replayed by the image replay unit of the image replay device; and the control unit of the image replay device replays images using the slide show data that has been acquired, on the basis of a command from a user.

4. The image replay system according to claim 1, wherein:

the identification unit of the digital camera identifies the main photographic subject during photography;

if a plurality of main photographic subjects have been identified by identification unit of the digital camera during photography, the control unit of the digital camera photographs an image while matching the focal point to that main photographic subject of which images have been replayed most times upon the image replay device.

5. The image replay system according to claim 1, wherein:

the replay condition data further includes the number of times, for each of the main photographic subjects that have been identified by the identification unit of the image replay device, that an image thereof has been replayed as magnified by the replay unit; and the control unit of the digital camera changes the photographic resolution during photography, according to the number of times that an image of the identified main photographic subject has been displayed upon the image replay device as magnified.

6. An image replay device, wherein:

the image replay device is able to be connected with a digital camera via a predetermined connection interface by cable connection or by wireless connection, comprising:

a control device;

an image recording unit that acquires image information from a digital camera, and records it upon a recording medium;

an image replay unit that replays the image information recorded on the recording medium;

an identification unit that identifies main photographic subject in an image that has been read down from the digital camera; and a transmission and reception unit that enables to transmit to digital camera usage condition data related to usage conditions of the image replay device when it has been detected that the digital camera has been connected via the connection interface, wherein:

the usage condition data includes replay condition data that specifies the number of times, for each of the main photographic subjects that have been identified by the identification unit of the image replay device, that an image thereof has been replayed by the replay unit, and the usage condition data transmitted to the digital camera is used by the control unit of the digital camera to change the settings of the digital camera during photography, on the basis of the number of times that the image of each main photographic subject which is specified by the identification unit of the digital camera has been replayed by the replay unit of the image replay device.

\* \* \* \* \*